US010406431B2

(12) United States Patent
Campbell et al.

(10) Patent No.: US 10,406,431 B2
(45) Date of Patent: Sep. 10, 2019

(54) HAND-HELD CONTROLLER WITH A BACK SHELL AND UNDERLYING FORCE SENSITIVE RESISTORS

(71) Applicant: VALVE CORPORATION, Bellevue, WA (US)

(72) Inventors: Ian Campbell, Bellevue, WA (US); Jeffrey Bellinghausen, Bellevue, WA (US); Scott Dalton, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 15/630,081

(22) Filed: Jun. 22, 2017

(65) Prior Publication Data

US 2019/0118080 A1    Apr. 25, 2019

Related U.S. Application Data

(63) Continuation-in-part of application No. 15/234,893, filed on Aug. 11, 2016.

(51) Int. Cl.
*A63F 13/98* (2014.01)
*A63F 13/24* (2014.01)

(52) U.S. Cl.
CPC .............. *A63F 13/24* (2014.09); *A63F 13/98* (2014.09); *A63F 2300/1043* (2013.01)

(58) Field of Classification Search
CPC ...................................................... A63F 13/00
See application file for complete search history.

(56) References Cited

U.S. PATENT DOCUMENTS

| 5,969,440 | A | * | 10/1999 | Young .............. E05B 65/1053 292/92 |
|---|---|---|---|---|
| 5,989,123 | A | | 11/1999 | Tosaki et al. |
| 6,362,813 | B1 | | 3/2002 | Worn et al. |
| 6,394,906 | B1 | | 5/2002 | Ogata |
| 6,760,013 | B2 | | 7/2004 | Willner et al. |
| 7,859,514 | B1 | | 12/2010 | Park |
| 8,641,525 | B2 | | 2/2014 | Burgess et al. |
| 9,089,770 | B2 | | 7/2015 | Burgess et al. |
| 9,289,688 | B2 | | 3/2016 | Burgess et al. |
| 9,352,229 | B2 | | 5/2016 | Burgess et al. |
| 2007/0036372 | A1 | | 2/2007 | Vonlanthen et al. |

(Continued)

OTHER PUBLICATIONS

Office Action for U.S. Appl. No. 15/234,893 dated Feb. 23, 2018, "Video Game Controlling with Unitary Back Shell for Button Control and Battery Access," Bellinghausen, 13 pages.

(Continued)

*Primary Examiner* — James S. McClellan
*Assistant Examiner* — Syvila Weatherford
(74) *Attorney, Agent, or Firm* — Lee & Hayes, P.C.

(57) ABSTRACT

A hand-held controller includes a controller body having a front and a back, with at least one thumb control on the front of the controller body. A back shell on the back of the controller body has left and right portions, each having top and bottom regions. A first force sensitive resistor (FSR) underlies the top region of the left portion of the back shell. A second FSR underlies the bottom region of the left portion of the back shell. A third FSR underlies the top region of the right portion of the back shell. A fourth FSR underlies the bottom region of the right portion of the back shell.

34 Claims, 6 Drawing Sheets

(56) References Cited

U.S. PATENT DOCUMENTS

| | | | |
|---|---|---|---|
| 2008/0179412 A1* | 7/2008 | Rhodes | F24F 11/30 |
| | | | 236/1 C |
| 2010/0073283 A1 | 3/2010 | Enright | |
| 2010/0298053 A1 | 11/2010 | Kotkin | |
| 2013/0281213 A1* | 10/2013 | Yasuda | A63F 13/42 |
| | | | 463/39 |
| 2014/0323220 A1 | 10/2014 | Lee | |
| 2015/0238855 A1 | 8/2015 | Uy et al. | |
| 2016/0349885 A1* | 12/2016 | Kang | A45C 11/00 |
| 2017/0092446 A1 | 3/2017 | Schmitz | |
| 2017/0180523 A1* | 6/2017 | Fernandes | H04B 1/3888 |
| 2017/0189800 A1* | 7/2017 | Crain | A63F 13/24 |

OTHER PUBLICATIONS

Office Action for U.S. Appl. No. 15/234,893 dated Jul. 11, 2018, "Video Game Controlling with Unitary Back Shell for Button Control and Battery Access," Bellinghausen, 16 pages.

"Rapid Fire Mod for Wireless Xbox 360 Controller," retrieved on Apr. 22, 2016 from <<https://www.google.com/search?rlz=1C1GCEU_enUS819US819&q=phl+hr+420+%22Rapid+Fire+Mod+for+Wireless+Xbox+360+Controller%22&spell=1&sa=X&ved=0ahUKEwjepJ638ebfAhXLzIQKHUhdCdMQBQgpKAA&biw=2133&bih=1210>>, postings Mar. 9, 2008 to Jul. 13, 2008, 16 pages.

\* cited by examiner

HAND-HELD CONTROLLER WITH A BACK SHELL AND UNDERLYING FORCE SENSITIVE RESISTORS

CROSS-REFERENCE TO RELATED APPLICATION

This application claims priority under 35 U.S.C. § 120 as a continuation-in part to pending U.S. patent application Ser. No. 15/234,893 filed on 11 Aug. 2016, entitled "VIDEO GAME CONTROLLER WITH UNITARY BACK SHELL FOR BUTTON CONTROL AND BATTERY ACCESS," which is incorporated by reference herein.

BACKGROUND

The video game industry has become large and important, and has spawned many innovations in both software and related hardware. Various hand-held video controllers have been designed, manufactured, and sold, for a variety of game applications. For example, numerous patents have issued on purportedly advantageous button configurations or types for video game controllers. Some video game controllers are connected to other game hardware by a cable, and hence do not require their own power supply. Other video game controllers establish a wireless connection with other game hardware, and so require batteries. Hence, there is a need in the art for improved wired and wireless video game controller designs that may better facilitate user operation or battery replacement.

DETAILED DESCRIPTION OF EXAMPLE EMBODIMENTS

Figure 1:
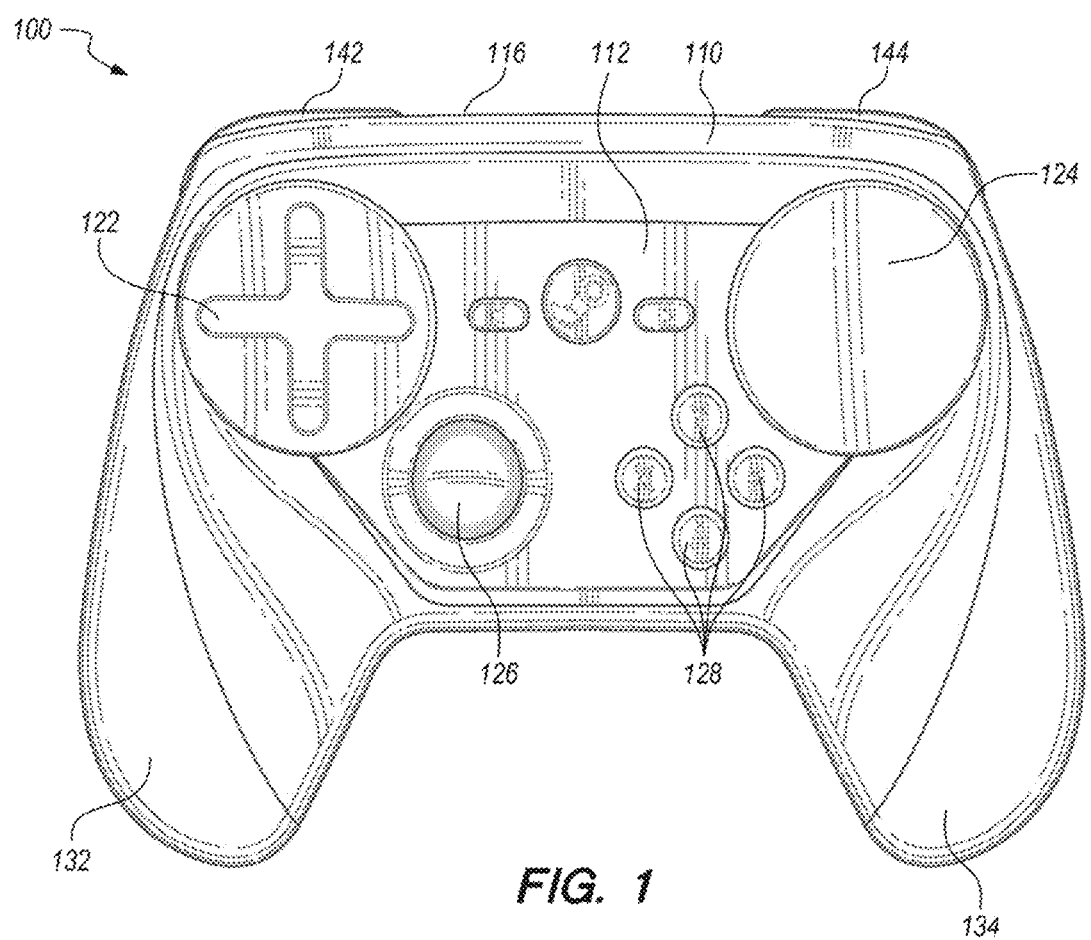
FIG. 1 is a front view of a hand-held video game controller according to an embodiment of the present invention.

FIG. 1 is a front view of a hand-held video game controller 100 according to an embodiment of the present invention. In this context, a controller is considered to be hand-held if it is operated by the hands of the user, whether or not the entire controller is supported by the user's hands. The controller 100 may include a controller body 110 having a front 112 and a back (not visible in FIG. 1). In the embodiment of FIG. 1, the front 112 of the controller body 110 may include a plurality of thumb controls 122, 124, 126, 128. For example, tilting button controls 122, 124, a joystick 126, each of the buttons 128, and any other button, knob, wheel, joystick, or trackball on the front 112 of the controller body 110, may be considered as a thumb control if it may be conveniently manipulated by a user's thumb during normal operation while the controller 100 is held in the hands of the user.

As shown in the example of FIG. 1, the controller 100 may also have an optional left upper trigger 142 and an optional right upper trigger 144, each located along a top edge 116 of the controller body 110, and typically controlled by the user's index fingers during normal operation while the controller 100 is held in the hands of the user. In certain embodiments, the controller body 110 may include a left handle portion 132 and a right handle portion 134, to facilitate handling by the user. In certain embodiments, the left and right handle portions 132, 134 may optionally be simply the left and right edges of the controller body 110 (if that's where the user would normally place her hands during normal use of the controller 100).

Figure 2:
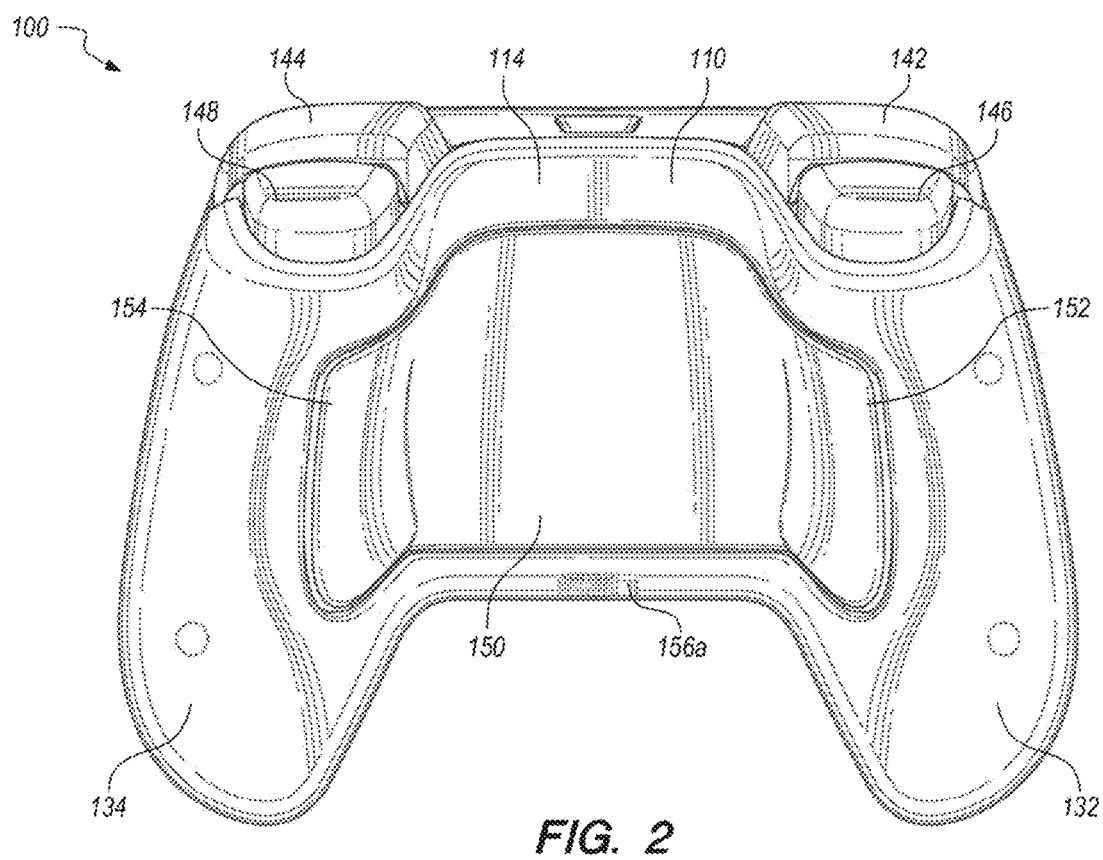
FIG. 2 is a back view of the hand-held video game controller of FIG. 1.

FIG. 2 is a back view of the hand-held video game controller 100, showing the back 114 of the controller body 110. The optional left upper trigger 142 and an optional right upper trigger 144 are also visible in the back view of FIG. 2, as are the left handle portion 132 and a right handle portion 134. The back 114 of the controller body 110 optionally may also include left and right under triggers 146, 148, which may be conveniently manipulated by the user's index or middle fingers during normal operation while the controller 100 is held in the hands of the user.

In the embodiment of FIG. 2, the back 114 of the controller body 110 may include a back shell 150 that is preferably a single monolithic component (e.g. a single injection-molded plastic component), and is preferably but not necessarily removable. In the embodiment of FIG. 2, the back shell 150 is optionally approximately centrally located between the left and right handle portions 132, 134. In certain embodiments, the removable back shell 150 may be removable by a conventional latch mechanism component 156*a*. In certain alternative embodiments, the back shell 150 may conventionally snap in or out of place on the controller body 110, by a conventional snap-in/snap-out interference of parts.

In certain embodiments, the back shell 150 may be resilient, i.e. able to be moved or flexed from a rest position by the force of a user's finger, but returning to a rest position when not under load. In certain embodiments, the resilient nature of the back shell 150 may enable it to selectively depress one or more underlying control buttons or sensors in response to forces or pressures selectively applied by the user (e.g. by the user's fingers other than the thumbs, most usually the user's middle, ring, or little fingers). For example, contiguous and unitary left and right wing portions 152, 154 may be readily accessible to the fingers of the user's left and right hands, respectively, during normal operation while the controller 100 is held in the hands of the user.

Figure 3:
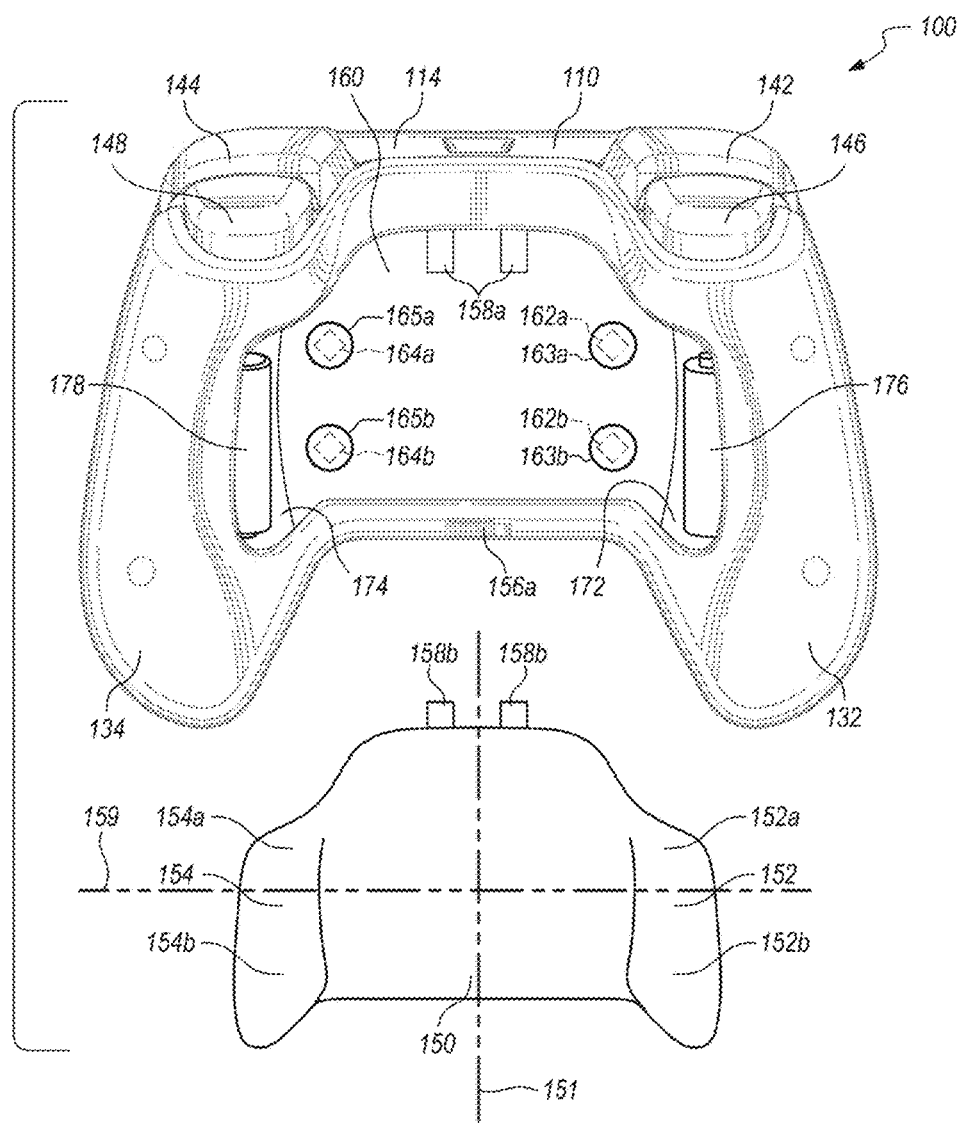
FIG. 3 is a back view of a hand-held video game controller of FIG. 2, with a back shell removed to reveal underlying features.

FIG. 3 is a back view of the hand-held video game controller 100, with the back shell 150 removed to reveal certain underlying features. In the embodiment of FIG. 3, the left wing portion 152 of the back shell 150 has a top region 152*a* and a bottom region 152*b*. Likewise, the right wing portion 154 of the back shell 150 has a top region 154*a* and a bottom region 154*b*. A first force sensitive resistor (FSR) 162*a*, shown in dashed lines, underlies the top region 152*a* of the left wing portion 152 of the back shell 150 when it is attached to the controller body 110. In this context, a FSR is a transducer that has an electrical resistance (e.g. the resistance R of first FSR 162*a* shown in FIG. 6) that changes based on the applied force that it experiences. Such resistance can be sampled by a circuit that drives a current through the variable resistance of that transducer.

Likewise, in the embodiment of FIG. 3, a second FSR 162b underlies the bottom region 152b of the left wing portion 152 of the back shell 150, a third FSR 164a underlies the top region 154a of the right wing portion 154 of the back shell 150, and a fourth FSR 164b underlies the bottom region 154b of the right wing portion 154 of the back shell 150. When the back shell 150 is attached to the back of the controller body 110 (e.g. by engagement of tabs 158b into tab receiving holes 158a), the user may selectively apply a force to the first, second, third, and/or fourth FSRs 162a, 162b, 164a, and 164b by flexing a portion of the back shell 150 into direct or indirect contact therewith.

In this context, the left wing portion 152 may include the portion of the back shell 150 that is to the left (as viewed from the front of the controller 100) of a longitudinally bisecting centerline 151 of the back shell 150, and the right wing portion 154 may include the portion of the back shell 150 that is to the right (as viewed from the front of the controller 100) of the longitudinally bisecting centerline 151. Since the view of FIG. 3 is towards the back of the controller 100, the left wing portion 152 is to the viewer's right, and the right wing portion 154 is to the viewer's left. In certain embodiments, the top regions 152a and 154a, may substantially comprise an upper half of the back shell 150 (e.g. above a horizontally bisecting line 159), and the bottom regions 152b and 154b may substantially comprise a lower half of the back shell 150 (below a horizontally bisecting line 159).

Figure 6:
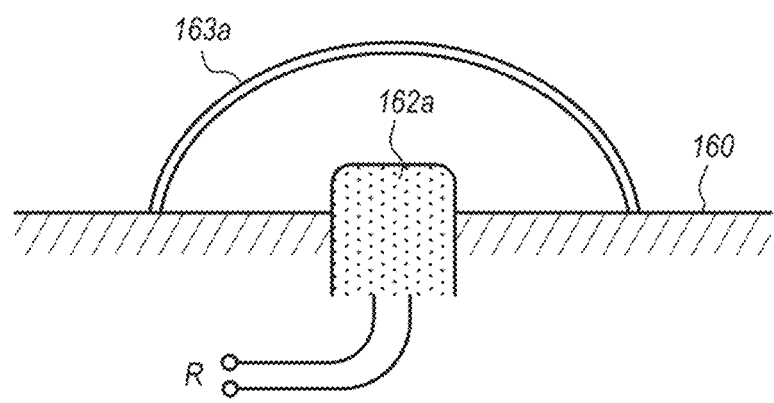
FIG. 6 is a cross-sectional schematic illustration of a force sensitive resistor mounted in the back of a controller body beneath an example collapsible spring structure.

In the embodiment of FIG. 3, each of the FSRs may be disposed beneath one of a plurality of collapsible spring structures 163a, 163b, 165a, and 165b. In certain embodiments, each of the collapsible spring structures 163a, 163b, 165a, and 165b may be disposed between the back shell 150 and a corresponding one of the first, second, third, and fourth FSRs 162a, 162b, 164a, and 164b that may be mounted on or in a recessed region 160 of the back 114 of the controller 100. For example, as shown in FIG. 6, the collapsible spring structure163a may comprise a resilient dome positioned over the corresponding first FSR 162a. In certain embodiments, a magnitude of a force that is applied (via the back shell 150) to collapse the collapsible spring structure 163a may be sensed by the corresponding first FSR 162a, only after the collapsible spring structure 163ahas fully collapsed upon it.

Optionally, each of a plurality of electrical switches may be disposed between the back shell 150 and a corresponding one of the first, second, third, and fourth FSRs 162a, 162b, 164a, and 164b. For example, still referring to FIG. 6, the resilient dome 163a may comprise an electrically conductive material (e.g. stainless steel) and form one pole of a binary switch (e.g. a momentary contact switch), which may selectively be brought into contact with a surface of the first FSR 162a, by being collapsed upon it by action of a force applied by the user via the back shell 150. In that case, the binary presence or absence of contact between the resilient dome 163a and the FSR 162a may serve as an electrical switch mechanism that changes state (from electrically conductive to non-conductive, or vice versa) in a binary manner, while the FSR 162a is able to sense the magnitude of the collapsing force in an analogue manner after contact is made with the resilient dome 163a.

In this context, the magnitude of force is considered to be sensed by the FSR if at least a portion of the applied force is sensed by the FSR. For example, not necessarily all of the force is sensed by the FSR 162a, because a portion of the force may be borne by the collapsible spring structure 163a. In an alternative embodiment, a conventional switch may be disposed between the back shell 150 and the FSR 162a. The foregoing switch alternatives optionally may be applied to each of the first, second, third, and fourth FSRs 162a, 162b, 164a, and 164b.

In the embodiment of FIG. 3, the controller 100 includes two battery compartments 172, 174 that are selectively accessible by removal of the back shell 150. Hence, in this particular embodiment, the back shell 150 is a removable battery cover. In this context, the battery compartments 172, 174 are considered to be selectively accessible because they are accessible when the user removes the removable battery cover 150, but is not accessible when the user does not remove the removable battery cover 150. In this context, a compartment is considered as a battery compartment if it includes electrodes (e.g. conventional electrodes) that are configured to contact electrically conductive surfaces of the battery.

Optionally but not necessarily, each of the battery compartments 172, 174 may receive one or more batteries (e.g. AA or AAA sized conventional batteries 176, 178, or another conventional battery configuration such as 9V batteries, etc.). As shown in FIG. 3, each of the two battery compartments 172, 174 is optionally but not necessarily disposed in (i.e. at least partially disposed in) a corresponding one of the left and right handle portions 132, 134, respectively.

Figure 4:
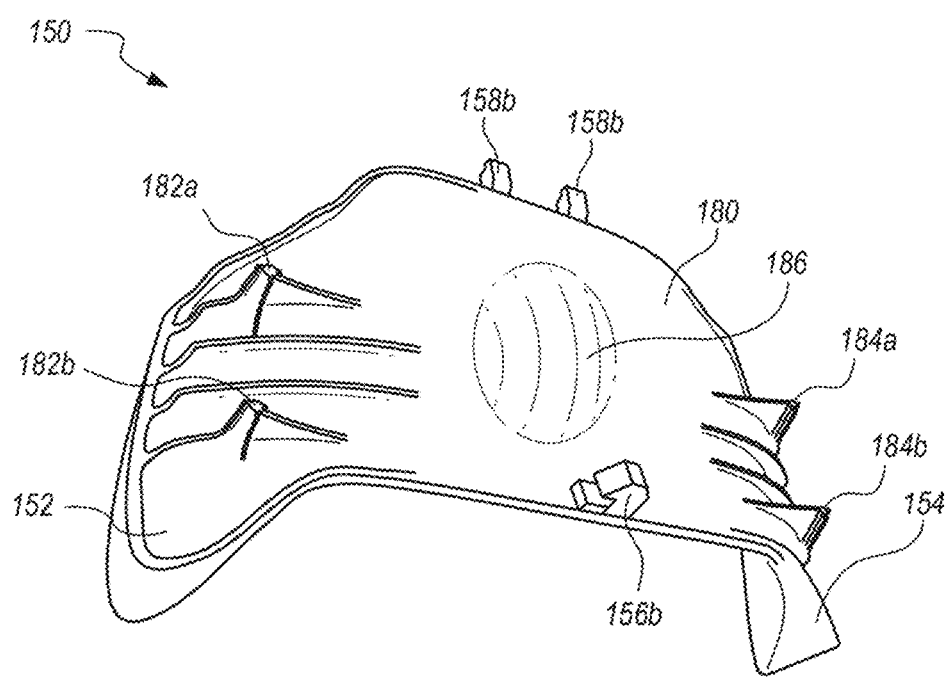
FIG. 4 is an underside perspective view of the back shell of FIG. 3.

FIG. 4 is an underside perspective view of the back shell 150. Now referring to FIGS. 3 and 4, the back shell 150 has a shell underside 180 that optionally may include a plurality of projections 182a, 182b, 184a, and 184b, configured to contact corresponding ones of the plurality of collapsible spring structures 163a, 163b, 165a, and 165b, respectively. The shell underside 180 optionally may also include a latch component 156b that engages with the conventional latch component 156a to facilitate removal and reattachment of the removable back shell 150.

In certain embodiments, the underside 180 of the removable back shell 150 may further include a rearward fulcrum bulge 186 disposed between the left rearward projections 182a, 182b, and the right rearward projections 184a, 184b. For example, the rearward fulcrum bulge 186 optionally may be approximately centrally located between left and right edges of the removable back shell 150. In certain embodiments, the rearward fulcrum bulge 186 preferably may be in contact with the controller body 110 when the back shell 150 is attached thereto. In such embodiments, the back shell 150 may optionally rock or flex about the rearward fulcrum bulge 186, so that one or more of the left rearward projections 182a, 182b, and right rearward projections 184a, 184b can selectively depress one or more of the underlying collapsible spring structures 163a, 163b, 165a, and 165b, respectively, in response to forces or pressures selectively applied by the user.

In an alternative embodiment, the controller 100 may include two binary switches or collapsible springs on the controller body 110, each being on an opposite side of the fulcrum bulge 186. In that alternative embodiment, the switch or collapsible spring on one side of the fulcrum bulge 186 is designed to never bottom out to carry any load, so that the two FSRs on that same side can sense variable or differential force for a scrolling functionality on that side.

Alternatively, scrolling may be sensed using the embodiment of FIG. 3, also by sensing of the varying or differential force carried by FSRs on the same side (e.g. either FSRs 162a and 162b, or FSRs 164a and 164b), after the corresponding collapsible spring structures have bottomed out. In this context, such a scrolling functionality may obtained by comparing the forces sensed by top and bottom FSRs on the same side, for example, via a difference or ratio determined the sensing system circuit and software (e.g. so that a scrolling motion by a user's finger on the outside of the battery cover may be effectively sensed).

Figure 5:
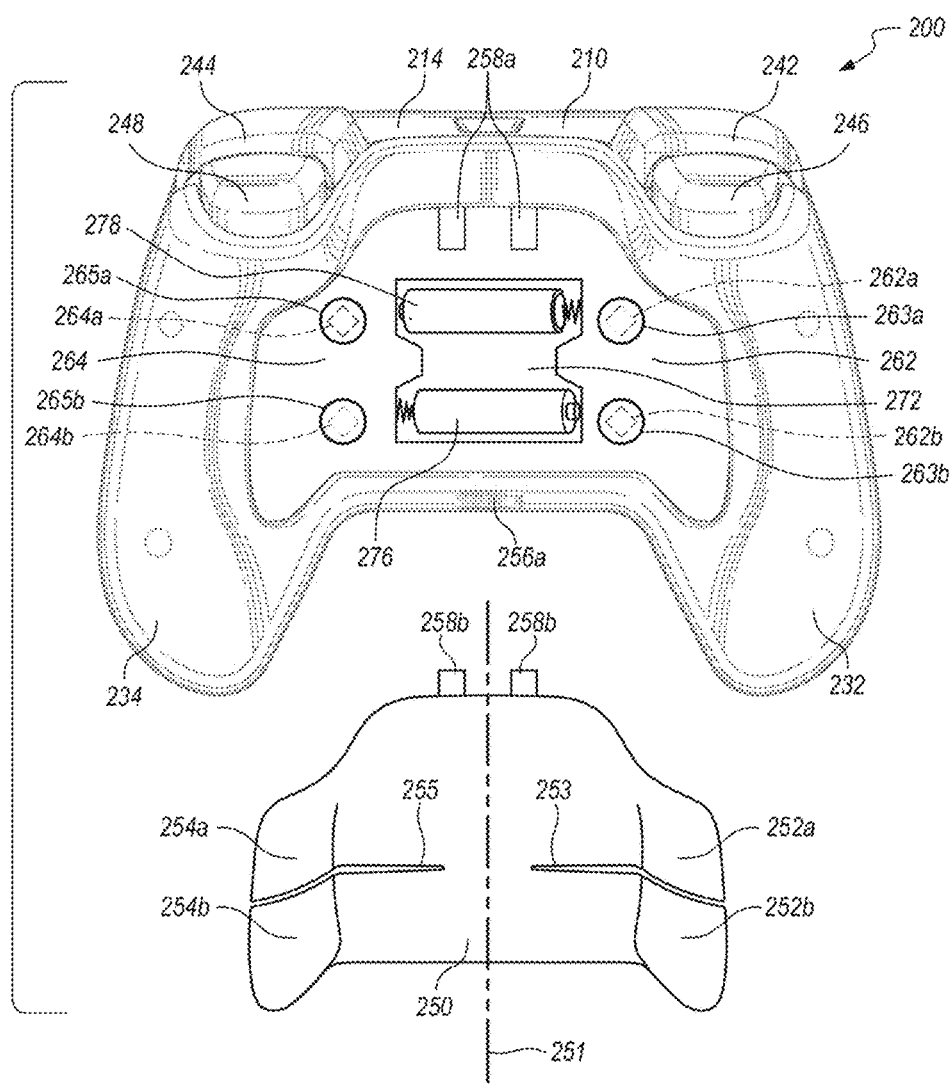
FIG. 5 is a back view of a hand-held video game controller according to another embodiment of the present invention, with a back shell removed to reveal underlying features.

FIG. 5 is a back view of a hand-held video game controller 200 according to another embodiment of the present invention, with a back shell 250 removed to reveal underlying features. The game controller 200 may include a controller body 210 having a back 214. The controller 200 optionally may include left and right upper triggers 242, 244, and optional left and right under triggers 246, 248. These triggers may be located so as to be conveniently manipulated by the user's index or middle fingers during normal operation while the controller 200 is held in the hands of the user.

In the embodiment of FIG. 5, the back shell 250 preferably may be a single monolithic component (e.g. a single injection-molded plastic component), and optionally may be approximately centrally located between left and right handle portions 232, 234. In certain embodiments, the back shell 250 may be removable by a conventional latch mechanism component 256a. In certain alternative embodiments, the back shell 250 may conventionally snap in or out of place on the controller body 210, by a conventional snap-in/snap-out interference of parts.

In the embodiment of FIG. 5, the back shell 250 includes a left wing portion that has a top region 252a and a bottom region 252b. Likewise, the back shell 250 includes a right wing portion that has a top region 254a and a bottom region 254b. A first FSR 262a, shown in dashed lines, underlies the top region 252a of the left wing portion of the back shell 250 when it is attached to the controller body 210. Likewise, a second FSR 262b underlies the bottom region 252b of the left wing portion of the back shell 250, a third FSR 264a underlies the top region 254a of the right wing portion of the back shell 250, and a fourth FSR 264b underlies the bottom region 254b of the right wing portion of the back shell 250.

In the embodiment of FIG. 5, when the back shell 250 is attached to the back of the controller body 210 (e.g. by engagement of tabs 258b into tab receiving holes 258a), the user may selectively apply a force to the first, second, third, and/or fourth FSRs 262a, 262b, 264a, and 264b by flexing a portion of the back shell 250 into direct or indirect contact therewith. In the embodiment of FIG. 5, such flexing of the top regions 252a and/or 254a of the back shell 250, for selective force application to the first and/or third FSRs 262a, 264a, respectively, may be practically decoupled from the flexing of the bottom regions 252b and/or 254b of the back shell 250, for selective force application to the second and/or fourth FSRs 262b, 264b, respectively, for example by introducing optional left and right slots 253, 255, respectively, through the back shell 250.

In the embodiment of FIG. 5, the left slot 253 extends from a left edge of the back shell 250 towards a longitudinally bisecting centerline 251 in a middle portion of the back shell 250. Likewise, the right slot 255 extends from a right edge of the back shell 250 towards the longitudinally bisecting centerline 251 in the middle portion of the back shell 250. The left slot 253 is preferably disposed between the first and second FSRs 262a, 262b, respectively, and at least partially separates the top and bottom regions 252a, 252b of the left portion of the back shell 250. Likewise, the right slot 255 is preferably disposed between the third and fourth FSRs 264a, 264b, respectively, and at least partially separates the top and bottom regions 254a, 254b of the right portion of the back shell 250.

In this context, the left slot 253 is disposed to the left (as viewed from the front of the controller 200) of the longitudinally bisecting centerline 251 of the back shell 250, and the right slot 255 is disposed to the right (as viewed from the front of the controller 200) of the longitudinally bisecting centerline 251. Since the view of FIG. 5 is towards the back of the controller 200, the left slot 253 is to the viewer's right, and the right slot 255 is to the viewer's left.

In the embodiment of FIG. 5, each of the FSRs may be disposed beneath one of a plurality of collapsible spring structures 263a, 263b, 265a, and 265b. In certain embodiments, each of the collapsible spring structures 263a, 263b, 265a, and 265b may be disposed between the back shell 250 and a corresponding one of the first, second, third, and fourth FSRs 262a, 262b, 264a, and 264b that may be mounted on the controller body 210.

In the embodiment of FIG. 5, the controller 200 may include a single battery compartment 272 that is selectively accessible by removal of the back shell 250. In this context, the battery compartment 272 is considered to be selectively accessible because it is accessible when the user removes the back shell 250, but is not accessible when the user does not remove the back shell 250. As shown in the FIG. 5, the battery compartment 272 optionally may be approximately centrally located between the left and right handle portions 232, 234, and the battery compartment 272 may underlie the back shell 250. Optionally but not necessarily, the battery compartment 272 may receive one or more batteries (e.g. conventional AA or AAA sized batteries 276, 278, or a single 9V battery, etc.).

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:
1. A hand-held controller, comprising:
 a controller body having:
  a front;
  a back;
  a left handle portion; and
  a right handle portion;
 at least one thumb control disposed on the front of the controller body;
 a cover removably coupled to the back of the controller body, the cover having a left portion and a right portion, the left portion having a top region and a bottom region, the right portion having a top region and a bottom region;
 at least one compartment that is accessible by a removal of the cover;
 a first force sensitive resistor (FSR) disposed within the at least one compartment, the first FSR configured to sense a force applied to the top region of the left portion of the cover;

a second FSR disposed within the at least one compartment, the second FSR configured to sense a force applied to the bottom region of the left portion of the cover;

a third FSR disposed within the at least one compartment, the third FSR configured to sense a force applied to the top region of the right portion of the cover; and a fourth FSR disposed within the at least one compartment, the fourth FSR configured to sense a force applied to the bottom region of the right portion of the cover.

2. The hand-held controller of claim 1, wherein the cover is disposed between the left handle portion and the right handle portion.

3. The hand-held controller of claim 1, further comprising a plurality of collapsible spring structures, each being disposed between the cover and a corresponding one of the first, second, third, and fourth FSRs.

4. The hand-held controller of claim 3, wherein the cover has an underside that includes a plurality of projections configured to contact corresponding ones of the plurality of collapsible spring structures.

5. The hand-held controller of claim 3, wherein a magnitude of force that is applied via the cover to collapse one of the plurality of collapsible spring structures is sensed by the corresponding one of the first, second, third, and fourth FSRs in a fully collapsed state of the one of the plurality of collapsible spring structures.

6. The hand-held controller of claim 3, wherein each of plurality of the collapsible spring structures comprises a resilient dome positioned over the corresponding one of the first, second, third, and fourth FSRs.

7. The hand-held controller of claim 1, further comprising a plurality of switches, each being disposed between the cover and a corresponding one of the first, second, third, and fourth FSRs.

8. The hand-held controller of claim 7, wherein at least one of the plurality of switches is actuated to change state by a force applied via the cover, and a magnitude of the force is sensed by the corresponding one of the first, second, third, and fourth FSRs.

9. The hand-held controller of claim 1, wherein:
the cover includes a center portion disposed between the left portion and the right portion;
the left portion includes a left slot extending from a left edge of the cover towards the center portion, the left slot being disposed between the first FSR and the second FSR and at least partially separating the top region and the bottom region of the left portion; and
the right portion includes a right slot extending from a right edge of the cover towards the center portion, the right slot being disposed between the third FSR and the fourth FSR and at least partially separating the top region and the bottom region of the right portion.

10. The hand-held controller of claim 9, wherein the cover has an underside, and the underside includes a fulcrum bulge disposed in the center portion that is in contact with the controller body.

11. The hand-held controller of claim 1, further comprising a plurality of spring structures, the plurality of spring structures comprising at least a first spring structure, a second spring structure, a third spring structure, and a fourth spring structure, and wherein:
the first spring structure is disposed between the cover and the first FSR;
the second spring structure is disposed between the cover and the second FSR;
the third spring structure is disposed between the cover and the third FSR; and
the fourth spring structure is disposed between the cover and the fourth FSR.

12. The hand-held controller of claim 11, wherein the cover has an underside facing the at least one compartment, the underside including a plurality of projections comprising at least a first projection, a second projection, a third projection, and a fourth projection, and wherein:
the first projection is configured to contact the first spring structure;
the second projection is configured to contact the second spring structure;
the third projection is configured to contact the third spring structure; and
the fourth projection is configured to contact the fourth spring structure.

13. The hand-held controller of claim 11, wherein at least one of:
the first FSR is configured to sense the force applied to the top region of the left portion of the cover in a fully collapsed state of the first spring structure;
the second FSR is configured to sense the force applied to the bottom region of the left portion of the cover in a fully collapsed state of the second spring structure;
the third FSR is configured to sense the force applied to the top region of the right portion of the cover in a fully collapsed state of the third spring structure; or
the fourth FSR is configured to sense the force applied to the bottom region of the right portion of the cover in a fully collapsed state of the fourth spring structure.

14. The hand-held controller of claim 11, wherein at least one of:
the first spring structure comprises a first resilient dome disposed over the first FSR;
the second spring structure comprises a second resilient dome disposed over the second FSR;
the third spring structure comprises a third resilient dome disposed over the third FSR; or
the fourth spring structure comprises a fourth resilient dome disposed over the fourth FSR.

15. The hand-held controller of claim 1, further comprising a plurality of switches, the plurality of switches comprising at least a first switch, a second switch, a third switch, and a fourth switch, and wherein:
the first switch is disposed between the cover and the first FSR;
the second switch is disposed between the cover and the second FSR;
the third switch is disposed between the cover and the third FSR; and
the fourth switch is disposed between the cover and the fourth FSR.

16. The hand-held controller of claim 15, wherein:
at least one of the first switch, the second switch, the third switch, or the fourth switch is actuated to change state by a force applied via the cover; and
a magnitude of the force is sensed by at least one of the first FSR, the second FSR, the third FSR, or the fourth FSR.

17. A controller, comprising:
a body having:
a front;
a back;
a left handle portion; and
a right handle portion;
at least one control disposed on the front of the body;

a shell disposed on the back of the body and between the left handle portion and the right handle portion, the shell having a first area and a second area;

a first force sensitive resistor (FSR) that underlies the first area of the shell, the first FSR configured to detect a force applied to the first area of the shell; and a second FSR that underlies the second area of the shell, the second FSR configured to detect a force applied to the second area of the shell.

18. The controller of claim 17, wherein the shell comprises a single component having material continuity.

19. The controller of claim 17, further comprising a plurality of collapsible spring structures, each being disposed between the shell and a corresponding one of the first and second FSRs.

20. The controller of claim 19, wherein the shell has an underside that includes a plurality of projections configured to contact corresponding ones of the plurality of collapsible spring structures.

21. The controller of claim 19, wherein a magnitude of force that is applied via the shell to collapse one of the plurality of collapsible spring structures is sensed by the corresponding one of the first and second FSRs in a fully collapsed state of the one of the plurality of collapsible spring structures.

22. The controller of claim 19, wherein each of the plurality of the collapsible spring structures comprises a resilient dome positioned over the corresponding one of the first and second FSRs.

23. The controller of claim 17, further comprising a plurality of switches, each being disposed between the shell and a corresponding one of the first and second FSRs.

24. The controller of claim 23, wherein at least one of the plurality of switches is actuated to change state by a force applied via the shell and a magnitude of the force is sensed by the corresponding one of the first and second FSRs.

25. The controller of claim 17, further comprising a third FSR that underlies a third area of the shell and a fourth FSR that underlies a fourth area of the shell, and wherein:

the shell includes a left portion having the first area and the third area, a right portion having the second area and the fourth area, and a center portion disposed between the left portion and the right portion;

the left portion includes a left slot extending from a left edge of the shell towards the center portion, the left slot being disposed between the first FSR and the third FSR and at least partially separating the first area and the third area; and the right portion includes a right slot extending from a right edge of the shell towards the center portion, the right slot being disposed between the second FSR and the fourth FSR and at least partially separating second area and the fourth area.

26. The controller of claim 25, wherein the shell has an underside including a fulcrum bulge disposed in the center portion that is in contact with the body.

27. The controller of claim 17, further comprising a first spring structure and a second spring structure, wherein:

the first spring structure is disposed between the shell and the first FSR; and the second spring structure is disposed between the shell and the second FSR.

28. The controller of claim 27, wherein:

the shell includes a first projection and a second projection;

the first projection is configured to contact the first spring structure; and the second projection is configured to contact the second spring structure.

29. The controller of claim 27, wherein at least one of:

the first FSR detects the force applied to the first area in a fully collapsed state of the first spring structure; or the second FSR detects the force applied to the second area in a fully collapsed state of the second spring structure.

30. The controller of claim 27, wherein:

the first spring structure comprises a first resilient dome positioned over the first FSR; and the second spring structure comprises a second resilient dome positioned over the second FSR.

31. The controller of claim 17, wherein the shell includes a first projection and a second projection, the controller further comprising:

a first switch disposed between the first projection and the first FSR; and a second switch disposed between the second projection and the second FSR.

32. The controller of claim 31, wherein:

at least one of the first switch or the second switch is actuated to change state by a force applied via the shell; and at least one of a first magnitude of the force is sensed by the first FSR or a second magnitude of force is sensed by the second FSR.

33. The controller of claim 17, wherein the shell further includes a third area and a fourth area, the controller further comprising:

a third FSR that underlies the third area of the shell, the third FSR configured to detect a force applied to the third area of the shell; and a fourth FSR that underlies the fourth area of the shell, the fourth FSR configured to detect a force applied to the fourth area of the shell.

34. The controller of claim 33, wherein the shell comprises:

a left portion having the first area and the third area;

a right portion having the second area and the fourth area; and a center portion disposed between the left portion and the right portion.

* * * * *